United States Patent [19]

Harris

[11] Patent Number: 4,986,219
[45] Date of Patent: Jan. 22, 1991

[54] DYNAMIC ACTION BIRD FEEDER

[76] Inventor: Norman D. Harris, R.D. #4, Straw Rd., Hopkinton, N.H. 03229

[21] Appl. No.: 511,451

[22] Filed: Apr. 20, 1990

Related U.S. Application Data

[63] Continuation of Ser. No. 223,914, Jul. 25, 1988, abandoned.

[51] Int. Cl.⁵ .......................................... A01K 39/014
[52] U.S. Cl. .................................... 119/57.8; 119/61
[58] Field of Search ................ 119/57, 57.8, 57.9, 119/52.2, 52.1, 52.3, 61

[56] References Cited

U.S. PATENT DOCUMENTS

| | | | |
|---|---|---|---|
| 1,749,497 | 3/1930 | McGlashan | 119/61 |
| 2,801,611 | 8/1957 | Diecker | 119/57.8 |
| 3,093,111 | 6/1963 | Garrison | 119/61 |
| 3,174,459 | 3/1965 | Browne | 119/57.8 |
| 3,999,519 | 12/1976 | Rodemeyer | 119/51.01 |
| 4,188,913 | 2/1980 | Earl et al. | 119/57.9 |
| 4,204,500 | 5/1980 | Podjan | 119/57.8 |
| 4,462,337 | 7/1984 | Kilham | 119/57.9 |
| 4,649,865 | 3/1987 | Riggi | 119/57.9 |
| 4,767,088 | 8/1988 | Fielder et al. | 119/57.8 |

Primary Examiner—Paul J. Hirsch
Attorney, Agent, or Firm—Rines and Rines

[57] ABSTRACT

A novel expanded planar trough bird feeder is provided, resiliently suspended from a turntable to enable dynamic tilting, swinging and bouncing, and simultaneous rotating in response to the action of the feeding birds when desired.

6 Claims, 3 Drawing Sheets

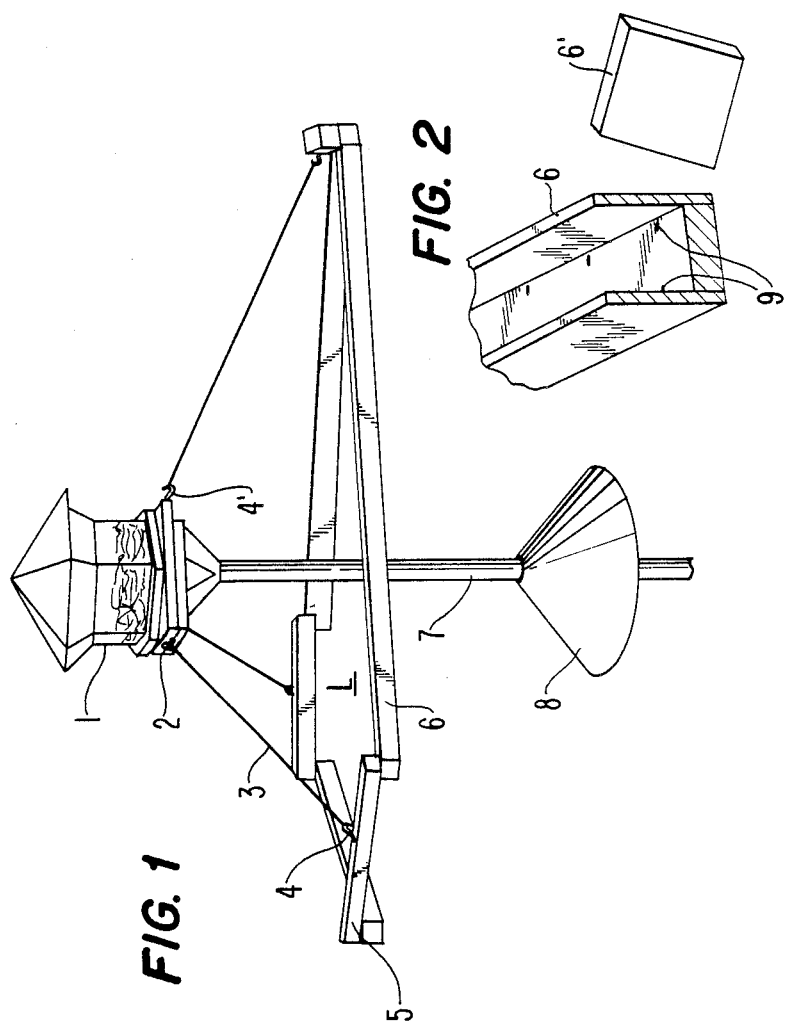

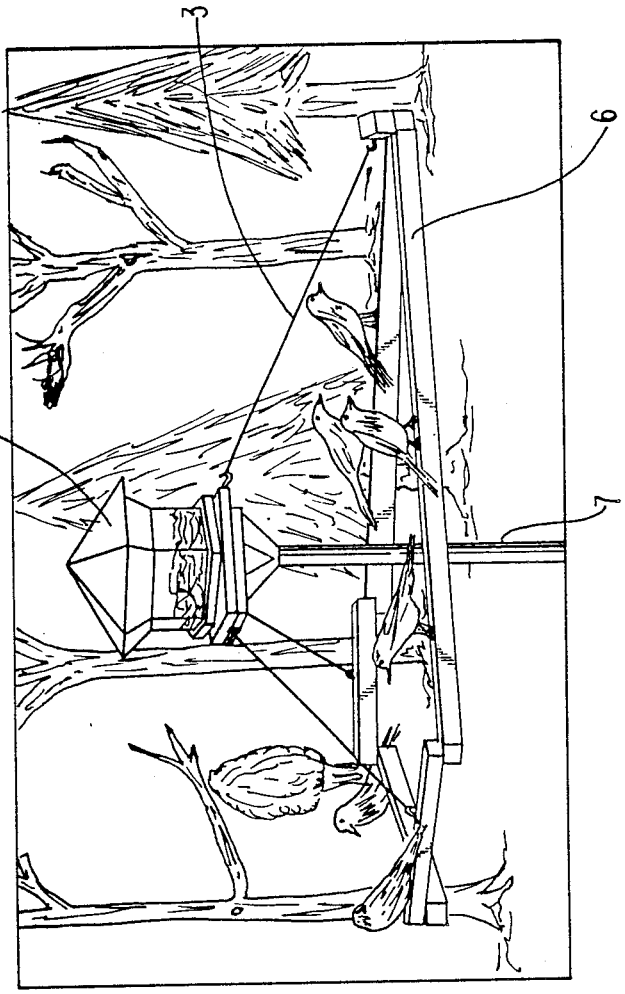

DYNAMIC ACTION BIRD FEEDER

This application is a continuation of U.S. patent application Ser. No. 223,914 7125188, now abandoned.

The present invention relates to bird feeders, being more particularly directed to feeders responsive to the movement of birds thereupon to set the feeder into dynamic mobility—swinging, tilting or rocking and rotating for the pleasure of both the birds and the observers.

The art is replete with numerous types of bird feeders and suspensions therefor including, for example, that discussed in my article "Cage That Squirrel-Out!", appearing in the Bulletin of the Massachusetts Audubon Society of April, 1950, pages 118 and 119. While some respond to movement of the birds in alighting, feeding and departing, they are not particularly designed either for exaggerating the movement of avian gymnastics or for providing sufficient free feeding space for larger birds to substantially prevent larger birds from driving away or "muscling" right out of the feeder the delightful smaller birds. A purple finch, for example, appears to demand at least 2 ½ inches of "free space" on both sides, while an evening grosbeak insists on 6 to 8 inches of sideroom, effectively forcing the little chickadees, titmice and nuthatches and the like away while they feed.

It has been found that a most delightful feeding show results when many birds of several species and size ranges all can feed together in one exciting display of flashing wings, eager beaks and instant comings and goings with all kinds of "elbowroom" so to speak, and with the feeder designed and mounted sensitively to swing, tilt, rock and simultaneously rotate dynamically in response to the action of the birds—and it is to this end that the present invention is primarily directed.

An object of the invention, accordingly, is to provide a new and improved bird feeder construction that obviates the above-mentioned disadvantages and provides, to the contrary, a new and expanded mobility in bird feeders to obtain the exciting display previously described.

Other and further objects will be explained hereinafter and are more particularly delineated in the appended claims.

In summary, however, from one of its broader aspects, the invention embodies a dynamic action bird-feeder having, in combination, a loop formed of bird-feed container channels suspended in horizontal plane balance from a vertical mast-supported internal central hub by a plurality of flexible but taught wire-like resilient suspension elements connected between spaced points of the loop and corresponding spaced points along the hub at acute angles with the loop and the mast, the loop being resiliently tiltable or swingable in a bouncing spring-like fashion out of balance from the horizontal plane in response to unbalancing forces exerted on points of the loop by birds contacting such points of the feed channels, and, preferably also, means for mounting the hub on the mast to permit its rotation about the mast to provide rotation of the loop during its tilting and oscillating swinging. Preferred and best mode details and embodiments are later presented.

The invention will now be described with reference to the accompanying drawings, FIG. 1 of which is an isometric view of a dynamic bird feeder constructed in accordance with a preferred embodiment of the invention;

FIG. 2 is a fragmentary view, upon an enlarged scale, of part of an opened trough feed container channel of FIG. 1;

FIG. 3 is a view of the feeder of FIG. 1 in actual operation;

Figure 4:
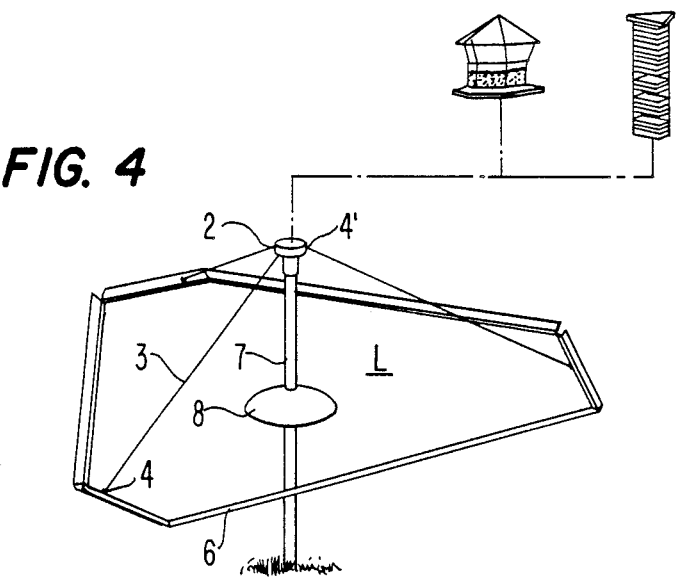
FIG. 4 is a view similar to FIG. 1 but taken from above to show the initial horizontal plane balance of the loop suspension.
Figure 5:
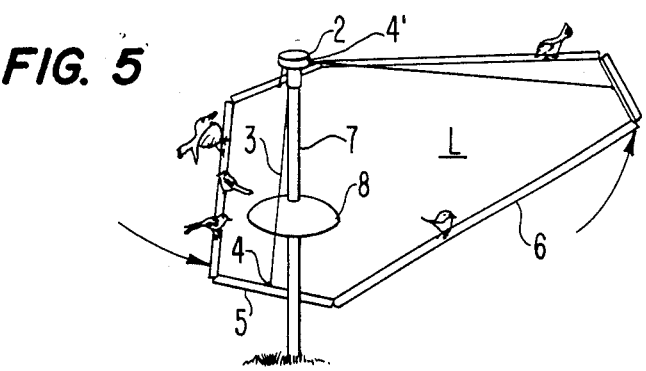
FIGS. 5 and 6 are similar views illustrating the oscillatory swinging, tilting and bouncing of the loop in response to birds alighting and leaving at different points and upsetting the balanced suspension to produce such girations.
Figure 6:
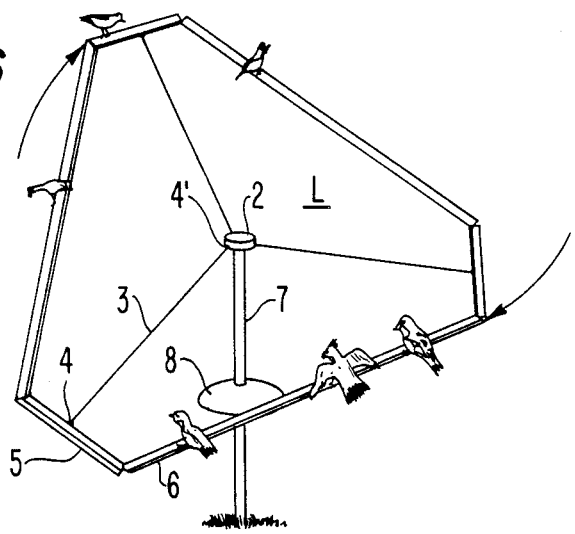

Referring to FIG. 1, the feeder of the invention is shown constructed as a substantially planar rigid loop L, exemplarily illustrated as of substantially equilaterial triangle contour, formed as of bird-feeder container troughs or channels 6 interconnected at their vertex regions by end pieces 5 intermediately carrying hooks or attaching points 4 at equilaterally preferably symmetrically circumferentially spaced points from which the loop L is suspended in horizontal plane balance by a plurality of flexible continuous and taught resilient support wire elements 3 or the like from corresponding circumferentially spaced hook or other attaching points 4' carried by an upper ball bearing turntable internal central hub 2 mounted upon a vertical supporting mast or pole 7, with the elements 3 forming acute angles with the plane of the loop and with the vertical mast. The loop L is thus resiliently tiltable and swingable in a spring-like and bouncing oscillatory fashion from its horizontal plane in response to unbalancing forces exerted on points of the loop and on the suspension elements 3 by birds contacting such different points of the feed channels or troughs 6 (FIGS. 5 and 6), all with the rotational freedom of the center turntable hub 2 permitting simultaneous rotation about the vertical axis of the pole or mast 7 during the tilting and swinging girations. The expanded triangle-of-troughs loop L held as illustrated by the flexible and resilient taught suspension elements 3 rocks and swings and bounces freely when activated by the comings and goings of the bird, with this motion being greatly exaggerated or amplified, especially when, in practice, different birds decide to feed at the same time, constantly shifting position (FIGS. 5 and 6—note arrows depicting motion), up and down and across as each new bird flies in to see the abundant open spots provided by this construction. It has been observed, indeed, that sometimes the small birds such as the chickadees and tufted titmice will perch on the slender supporting wire elements 3 while waiting for an opening, adding to the abundance and dynamics of the scene. When, moreover, the feeder L is both swinging and rotating, the amazing contortions of the birds are unpredictable and entrancing.

If desired, as shown, a conventional storage-type hopper feeder 1 may be mounted at the top, though actual operation has shown that when feed is available in both the hopper feeder 1 and the channel trough feeders 6 the birds seem far more partial to the channel feeders. These are readily filled with seeds, such as thick neck sunflower seeds (black oil), by pouring from a scoop into each of the three long trough channels 6, moving from one vertex to the next, and simply rotating the loop L as the seed is dispensed.

Drain holes 9 may be provided as in the bottom of the trough channels 6, FIG. 2, and since the seed is distributed along the same, rain readily runs out through the drain holes. It has been found that when it snows, only a thin line of snow will remain on top of the narrow trough. With a gloved finger dipped into the trough channel 6, the feeder 2 may be rotated and the snow cleared from the troughs in one easy motion—that is, if the birds have not already quickly thrown the snow out as they dig for seed.

In experimental operation, successful channel troughs have been made of 3/16 inch wood sides, about 1 ½ inch tall and about ½ inch along the bottom, with removable end caps 6, FIG. 2, and about 38 inches in length, with one-foot connecting wood end pieces 5. With a four-inch ball bearing turntable 2, support wires 3 of ⅛-inch braided picture wire about 21 inches long were employed. A conventional conical squirrel guard 8 is shown provided at a lower point of the pole 7.

With this greatly increased feeding area available to the birds through the use of such narrow seed holders which may be of almost any design, size, shape, length and geometry, including a loop L more closely approximating a circle, if desired, or open or part of a loop, or other expanded plane construction, dynamically supported by flexible wire or similar elements from a center point or turntable, the free swinging and rotary dynamics of the invention may be obtained. Further modifications will also suggest themselves to those skilled in the art and such are considered to fall within the spirit and scope of the invention as defined in the appended claims.

What is claimed is:

1. A dynamic action bird-feeder having, in combination, a loop formed of bird-feed container channels suspended in horizontal plane balance from a vertical mast-supported internal central hub by a plurality of flexible but taught resilient wire-like suspension elements connected between circumferentially spaced points of the loop and corresponding spaced circumferential points along the hub at acute angles with the loop and the mast, the loop being thus suspended to be resiliently tiltable and swingable in a bouncing spring-like fashion out of balance from the horizontal plane in response to unbalancing forces exerted on points of the loop by birds contacting said points of the feed channels.

2. A bird-feeder as claimed in claim 1 and in which means is provided for mounting the center hub to permit its rotation about the mast to provide rotation of the loop during its tilting, bouncing and swinging.

3. A bird-feeder as claimed in claim 1 and in which the suspension elements are symmetrically disposed about the loop and the channels with a distribution that provides a balanced loop suspended in a horizontal plane when stationary.

4. A bird-feeder as claimed in claim 3 and in which the suspension elements are strands connected between symmetrically disposed circumferential points of the hub and corresponding symmetrically disposed points of the loop.

5. A bird-feeder as claimed in claim 4 and in which the loop is in the form substantially of an equilaterial triangle with the suspension elements connected to the vertex regions.

6. A bird-feeder as claimed in claim 4 and in which the loop is substantially circular.

* * * * *